United States Patent
Carballo et al.

(10) Patent No.: US 8,271,055 B2
(45) Date of Patent: Sep. 18, 2012

(54) INTERFACE TRANSCEIVER POWER MANAGEMENT METHOD AND APPARATUS INCLUDING CONTROLLED CIRCUIT COMPLEXITY AND POWER SUPPLY VOLTAGE

(75) Inventors: Juan-Antonio Carballo, Austin, TX (US); Jeffrey L. Burns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3040 days.

(21) Appl. No.: 10/302,494

(22) Filed: Nov. 21, 2002

(65) Prior Publication Data

US 2004/0203477 A1  Oct. 14, 2004

(51) Int. Cl.
  H04M 1/00 (2006.01)
  H04B 1/38 (2006.01)
  H01Q 11/12 (2006.01)
  H04B 1/04 (2006.01)
(52) U.S. Cl. ..................................... 455/574; 455/127.1
(58) Field of Classification Search .................. 455/574, 455/69, 115.1, 115.2, 115.3, 127.5, 343.1, 455/127.1, 127.4
See application file for complete search history.

(56) References Cited

U.S. PATENT DOCUMENTS

| | | |
|---|---|---|
| 3,587,044 A | 6/1971 | Jenkins |
| 3,676,583 A | 7/1972 | Morita et al. |
| 4,092,596 A | 5/1978 | Dickinson et al. |
| 4,803,638 A | 2/1989 | Nottingham et al. |
| 4,819,196 A | 4/1989 | Lilley |
| 5,016,269 A | 5/1991 | Rogers |
| 5,126,686 A | 6/1992 | Tam |
| 5,220,678 A | 6/1993 | Feei |
| 5,422,760 A | 6/1995 | Abbott et al. |
| 5,872,810 A | 2/1999 | Philips et al. |
| 5,880,837 A | 3/1999 | Roberts |
| 5,912,920 A | 6/1999 | Marchok |
| 5,982,833 A | 11/1999 | Waters |
| 6,134,214 A | 10/2000 | Takagi et al. |
| 6,178,215 B1 | 1/2001 | Zhang et al. |
| 6,215,816 B1 | 4/2001 | Gillespie et al. |
| 6,282,045 B1 | 8/2001 | Glover |
| 6,304,615 B1 | 10/2001 | Webster |

(Continued)

OTHER PUBLICATIONS

Dwivedi, et al., "Traffic Model for USA Long-distance Optical Network", Optical Fiber Communication Conference, 2000, vol. 1, pp. 156-158. Mehta, et al., "Fixed Sensor Networks for Civil Infrastructure Monitoring—An Initial Study", Dept. of ICS, UC Irvine, Aug. 2002.

Primary Examiner — Eugene Yun
(74) Attorney, Agent, or Firm — Mitch Harris, Atty at Law, LLC; Andrew M. Harris; Libby Z. Toub

(57) ABSTRACT

An interface transceiver power management method and apparatus including controlled circuit complexity and power supply voltage reduces power consumption when interface conditions will support a transceiver having reduced complexity. The power supply voltage of the reduced complexity logic is then reduced if the lowered complexity will support a lower power supply voltage. The reduced complexity in combination with a reduced power supply voltage decreases power consumption to a greater degree than reducing transceiver complexity alone.

The complexity of processing blocks within the receiver and/or transmitter are adjusted in conformity with one or more selection signals and an operating voltage level is selected in accordance with the requirements of the reduced complexity circuit. An interface quality measurement circuit may provide the selection signal, so that the transceiver complexity is adjusted in response to measured interface conditions or an external pin or register bit may be coupled to a select input.

3 Claims, 4 Drawing Sheets

U.S. PATENT DOCUMENTS

| | | |
|---|---|---|
| 6,377,076 B1 | 4/2002 | Gauthier |
| 6,389,069 B1 | 5/2002 | Mathe |
| 6,549,604 B2 | 4/2003 | Shenoi |
| 6,580,930 B1 * | 6/2003 | Fulghum et al. ............... 455/574 |
| 6,810,216 B1 * | 10/2004 | Tourunen ..................... 398/202 |
| 2003/0062926 A1 | 4/2003 | Wilcox et al. |
| 2003/0114205 A1 * | 6/2003 | Yamashita ................... 455/574 |
| 2004/0051555 A1 | 3/2004 | Wilcox et al. |
| 2004/0257114 A1 | 12/2004 | Hanneberg et al. |

\* cited by examiner

INTERFACE TRANSCEIVER POWER MANAGEMENT METHOD AND APPARATUS INCLUDING CONTROLLED CIRCUIT COMPLEXITY AND POWER SUPPLY VOLTAGE

CROSS-REFERENCE TO RELATED APPLICATION

The present application is related to U.S. patent application entitled "INTERFACE TRANSCEIVER POWER MANAGEMENT METHOD AND APPARATUS" Ser. No. 10/289,777 filed on Nov. 7, 2002, the specification of which is incorporated herein by reference.

BACKGROUND OF THE INVENTION

1. Technical Field

The present invention relates generally to communication link circuits, and more particularly, to transmitters and/or receivers having selectable complexity and operating voltage levels within signal processing blocks.

2. Description of the Related Art

Interfaces between present-day system devices and also between circuits have increased in operating frequency and complexity. In particular, high speed serial interfaces require data/clock extraction, jitter reduction, phase correction, error correction, error recovery circuits and equalization circuits that can become very complex, depending on the performance requirements of a particular interface. As the above-mentioned circuits become more complex, they have an increasingly large proportion of digital logic and the overall amount of digital logic employed in both receiver and transmitter circuits has increased substantially.

More complex digital receiver and transmitter circuits typically require higher minimum operating voltages, as maximum delay, minimum risetime and similar performance requirements are increased for more complex processing and are met at higher minimum operating voltages, which include power supply voltages and bias voltages that affect power consumption, such as bias or power-plane voltages applied to the substrate or body of a transistor.

Due to limited design resources and the need to satisfy the requirements of multiple interface applications, customers and channel conditions, transmitters and receivers within above-described interfaces are typically designed for the worst-case bit error rates and environmental conditions, leading to relatively complex receivers and high power transmitters and higher operating voltages than are required for every application or channel condition. As a result, it is not always possible to provide a receiver that is not more complex than necessary when a high channel quality is available. Higher complexity generally leads to a higher minimum operating voltage for the signal processing blocks. For example, processing delay associated with a pipelined digital filtering circuit depends on the complexity of the circuit, such as the number of levels of logic gates between latches and the number of latches in the filter circuit. A higher complexity circuit requires faster gates and latches to achieve the same processing delay, which in turn requires a higher minimum operating voltage for the circuit gates and latches. Similar minimum operating voltage determining factors such as phase correction resolution and range are present in other circuits. A higher operating voltage in turn raises both circuit power dissipation and power supply input requirements. Thus, both the complexity of the logic and the operating voltage of the processing circuits depend on the required performance parameters of the interface and the channel conditions connecting interface transceivers.

It is therefore desirable to provide an interface transceiver having reduced power consumption and signal processing supply voltage requirements.

SUMMARY OF THE INVENTION

The objective of providing an interface transceiver having reduced power consumption and signal processing supply voltage requirements is achieved in a method and apparatus. An interface transceiver includes one or more processing blocks having selectable power supply voltage and complexity. The complexity and operating voltage of the receiver and/or transmitter signal processing blocks may be adjusted in response to a select input, permitting the transceiver power consumption and operating voltage to be tailored to interface requirements.

Since lower speed logic can generally be used to implement lowered complexity circuits, the operating voltage and/or transistor body bias voltages can be adjusted to reduce power dissipation.

The complexity and power supply voltage selection process may be programmable by a logic connection, register bit or via a signal from an interface quality measurement circuit. A remote transceiver may also be power-managed from the other end of the interface by transmitting a control signal to the remote transceiver that selects complexity and processing block operating voltage at the remote transceiver.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
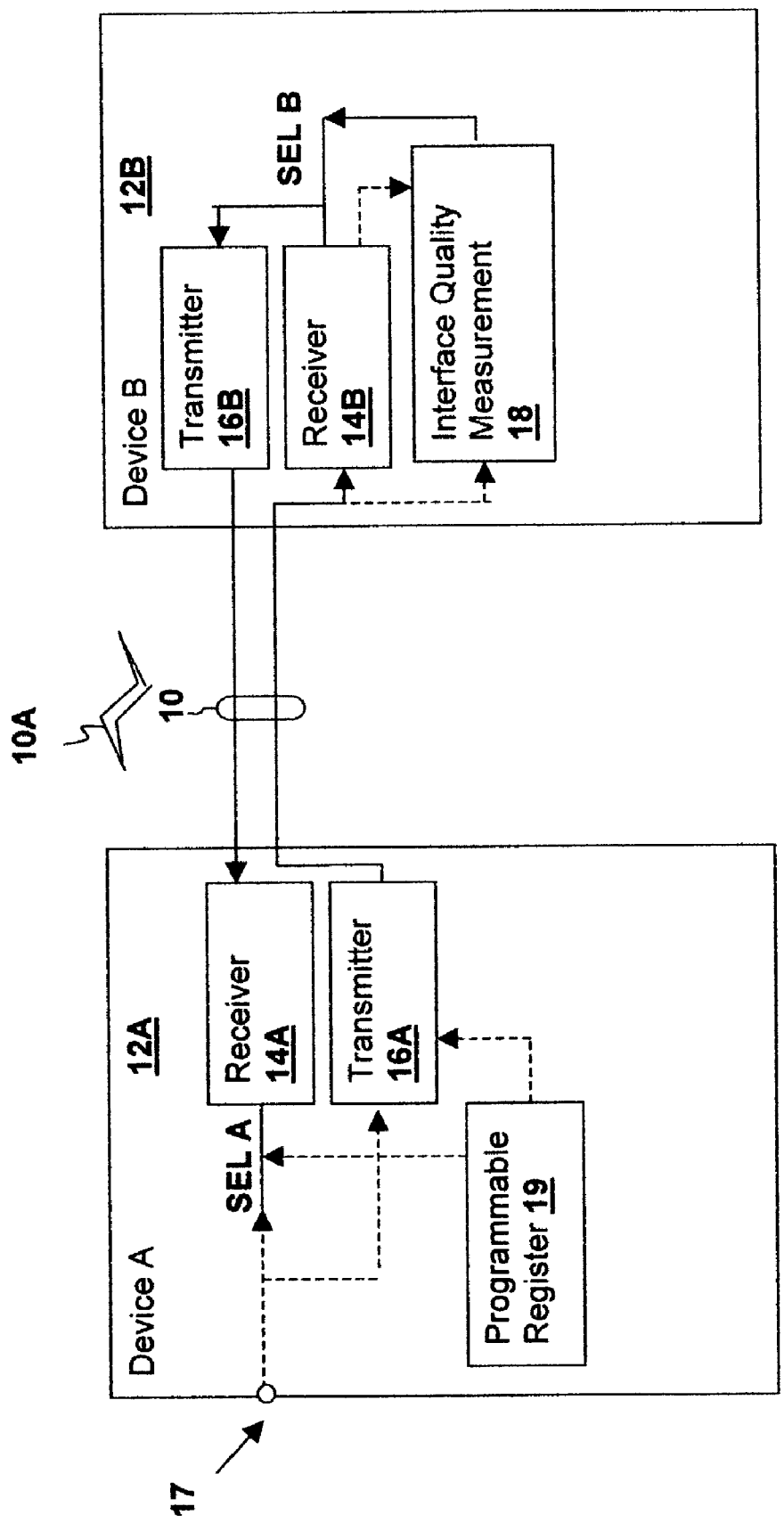
FIG. 1 is a block diagram of transceivers connected by an interface in accordance with an embodiment of the invention.

With reference now to the figures, and in particular with reference to FIG. 1, there is depicted a block diagram of transceivers 12A and 12B connected by an interface or channel 10 in accordance with an embodiment of the invention. Transceivers 12A, 12B may be located within a device such as a computer peripheral, a computer system, or within integrated circuits interconnected within a system. Interface 10 may be a single two wire bi-directional interface as depicted, or may be a full-duplex single wire interface or a bus having multiple transceivers in a half-duplex or full-duplex configuration. Alternatively, the connection may be a wireless connection 10A coupling transceivers 12A and 12B.

Transceivers 12A and 12B connected to interface 10 (or alternatively coupled via wireless connection 10A) each using a receiver 14A and 14B and a transmitter 16A and 16B, but the present invention is applicable to receivers and/or transmitters and it should be understood that a receiver or transmitter in accordance with an embodiment of the invention may be incorporated in devices for connection to any of the above-specified types of interface 10, as well as other forms of electrical signal interconnection. Additionally, the techniques of the present invention are applicable to wireless connections such as those connecting digital radios and wireless local area network (WLAN) devices that generally incorporate digital signal processing blocks as part of the receiver and/or transmitter circuits.

The interface circuits (transmitters 16A, 16B and receivers 14A, 14B) of the present invention incorporate select inputs SELA and SELB that reduce the complexity and power supply voltage of the connected interface circuits, in order to reduce power consumption. Circuit blocks having lower power consumption and/or operating voltage level may be switched in as alternatives or circuit blocks may be selectively disabled to reduce the number of gates, storage circuits, and/or transitions that occur when processing signals within interface circuits 14A-B and/or 16A-B. Analog circuit blocks within interface circuits may also be selectively simplified or eliminated 14A-B and/or 16A-B when channel conditions permit.

Thus, the above-described interface circuits provide a selectable power consumption and internal operating voltage levels that can be used to provide lower power usage and dissipation within transceivers 12A and 12B, when channel conditions are good, while maintaining low bit error rates (BERs) using a higher power consumption state when channel conditions are poor. For wireless connections, such as wireless connection 10A, shorter transmission/reception distance can permit selection of a reduced complexity and consequent power supply voltage requirement.

The selection of power consumption states via select input SELA may be hard-wired or externally programmed using an external signal terminal 17 or may be programmed using a bit register 19 within transceiver 12A. Receiver 14A, transmitter 16A or both may be controlled by one or more selection signals, for example, multiple bits may be provided for each of transmitter 16A and receiver 14A so that power consumption may be very finely traded off for receiver processing power or transmitter signal strength, etc. Alternatively, a single bit or external terminal may be used to set a single binary power consumption selection for both transmitter 16A and receiver 14A. Power supply voltage level selection may be made directly in concert with the complexity selection, or by an alternative mechanism such as a programmable power supply that is set in conformity with known requirements for a particular complexity setting for transmitter 16A and receiver 14A.

For simplicity, the term power supply voltage is used herein when referring to what is generally a common source or drain connection of a logic circuit, but within the context of the present invention, power supply voltage extends to include other voltages affecting circuit performance and power, specifically a bias or power-plane voltage applied to a substrate pin of circuit transistors, or "body" voltage. The body voltage may be adjusted to raise the threshold voltage of transistors within a processing circuit, lowering the power consumption due to leakage and switching dissipation, if the lowered complexity of the processing circuit permits the additional delay associated with the raised threshold voltage. For CMOS circuitry, separate bias voltages may be programmed for N-channel and P-channel devices, permitting raising of the N-channel threshold and lowering of the P-channel threshold (for positive supply circuits) to lower both leakage through the non-conducting transistor and decreasing cross-conduction logic transition power dissipation when reduced-speed logic is acceptable due to lowered complexity of the overall circuit.

Transceiver 12A is an example of a transceiver having external selection of complexity and operating voltage levels via register programming or external connection. As such, it is very useful in integrated circuits and systems, including computer systems, communication systems, or peripherals where external terminal 17 can be hard-wired depending on the application (e.g., known short shielded cable length attached to a peripheral dictates a high channel quality or connection of two transceivers on a high-quality circuit board also dictates high channel quality).

Transceiver 12B is an example of a transceiver having automatic channel-quality-based complexity selection and supply voltage level in response to a measurement performed by interface quality measurement block 18, which may be an eye-diagram circuit, an error detection circuit or other mechanism for detection that the channel quality is less than a desired threshold. Select signal SEL B is provided by an output of interface quality measurement block 18 and automatically selects higher or lower receiver and/or transmitter complexity in conformity with the measured channel quality. The operating voltage level is also adjusted for circuit blocks that can operate at a lower voltage level when complexity is reduced.

Another type of transceiver power consumption control is provided by an interface link wherein a register such as programmable register 19 may be set via reception of a command code sent over interface 10 and received by a receiver such as receiver 14A. The interface link control is very useful where the receiver and transmitter characteristics must match (such as when the select signal changes an error-correction length or when matching filters are used at each end of interface 10). Interface link control is also useful for informing a transceiver about channel conditions when the transceiver being programmed has no ability to determine the channel quality or does not have information regarding channel conditions (such as cable length).

Figure 2:
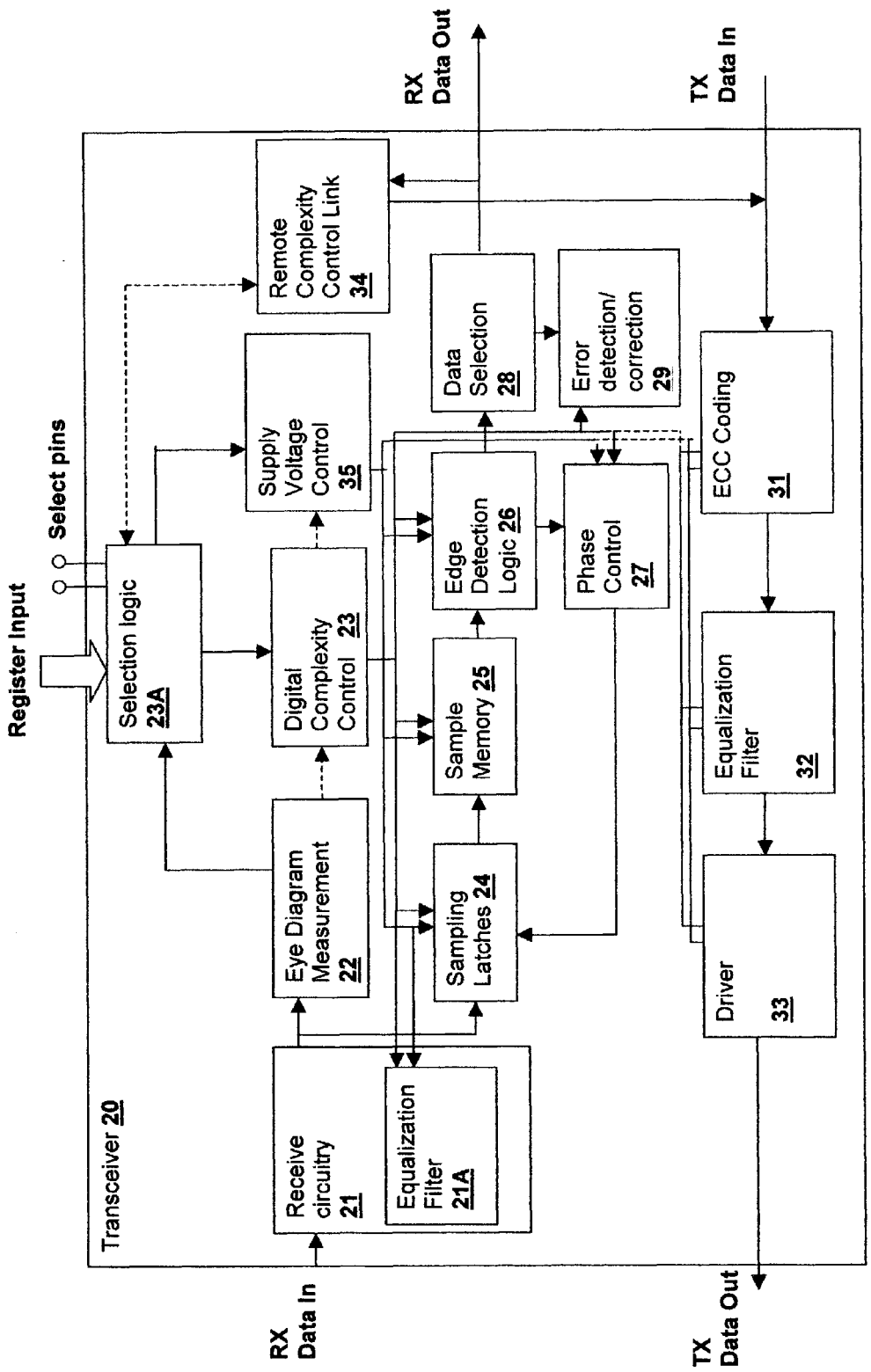
FIG. 2 is a block diagram of a transceiver in accordance with an embodiment of the invention.

Referring now to FIG. 2, details of a transceiver 20 in accordance with an embodiment of the invention are depicted. An interface signal is received at RX Data In and provided to a receiver circuit 21 that may contain an equalization filter 21A or may not. The output of receiver circuit 21 is generally presented to a series of sampling latches 24 and data is provided from sample latches 24 to a sample memory 25. Sampling latches 24 and sample memory 25 are used to "oversample" the received signal so that the edges of the signal can be determined with more accuracy in the face of high frequency jitter.

Edge detection logic 26 detects one or both edges of the received signal and provides early/late information to phase control 27, which in turn controls sampling latches 24 to compensate for low-frequency jitter. Data is extracted by data selection 28 and error detection and correction circuits 29 may be employed to further minimize the bit error rate (BER) of the received signal.

A digital complexity control circuit 23 provides one or more control signals to various of the above-described blocks to select a higher or lower power consumption depending on the channel requirements. A selection logic 23A may be coupled to digital complexity control 23 to provide a programmable register input interface or to accept state programming from external select pins. The selection input to selection logic 23A may be static or static/programmable as described above with respect to FIG. 1, or dynamic based upon an output of eye measurement diagram circuit 22 (or other suitable indicator of channel quality). Eye measurement diagram provides a measurement of the signal quality output of receive circuitry 21, giving an indicator of the impact of jitter on BER.

The power consumption of the various circuits is tailored by reducing the overall complexity or direct power levels used by the circuits and may be controlled by individual control bits or a single control bit. For example, the number of sampling latches 24 employed is proportional to the power consumption of the sampling 24 latches block, the size of sample memory 25, the resolution of the phase control circuit 27 and edge detection logic 27, and the depth of error correction and detection 29 are all proportional to their power consumption. Any or all of the above-listed circuit blocks may have selectable power consumption and may be controlled independently or together at one or more power consumption levels.

A supply voltage control circuit 35 is also coupled to selection logic 23A and also optionally or alternatively coupled to digital complexity control 23. Supply voltage control circuit 35 adjusts power supplies (including transistor body bias voltages) of one or more internal circuit blocks for which complexity is adjusted as described above. Once a lowered complexity is selected to achieve the performance requirements for the particular application and/or channel condition, the power supplies of one or more of the circuit blocks connected to supply voltage control may be lowered to a new minimum operating voltage level (or higher level as dictated by design margins), which can be achieved by direct programming of selection logic 23A or by signals derived from digital complexity control 23 based on the selection of complexity. A more general embodiment includes a single control block that performs computation of an optimal complexity/voltage level combination, either simultaneously or sequentially in either order. For example, an operating voltage level may be set and supportable circuit complexity then selected in conformity with the preset operating voltage level.

The transmitter portion of transceiver 20 comprises an optional error correction coding circuit 31, an optional equalization filter 32 and a driver 33 for transmitting data on the interface TX Data Out. Digital complexity control 23 may also control the complexity of the transmitter circuits, such as driver 33 current, equalization filter 32 length or ECC coding 31 depth. Supply voltage control 35 is also coupled to transmitter circuit processing blocks 31-33, so that the power supply voltages may be lowered if performance requirements may be met at a lowered supply voltage level.

Selection logic 23A is also shown coupled to an optional remote complexity control link 34 for controlling power consumption. (Alternatively remote complexity control link 34 may be coupled directly to digital complexity control 23 and/or supply voltage control 35.)

A command received at RX Data In can be received and decoded to control the complexity and operating voltage levels of the circuit blocks within transceiver 20 via the output of data selection 28. Remote complexity control link 34 is also shown coupled to the transmitter circuits for transmitting complexity control/voltage control information to a remote transceiver. These remote control features are optional and their implementation depends on whether it is possible and desirable to send and receive control information over the interface channel.

Figure 3:
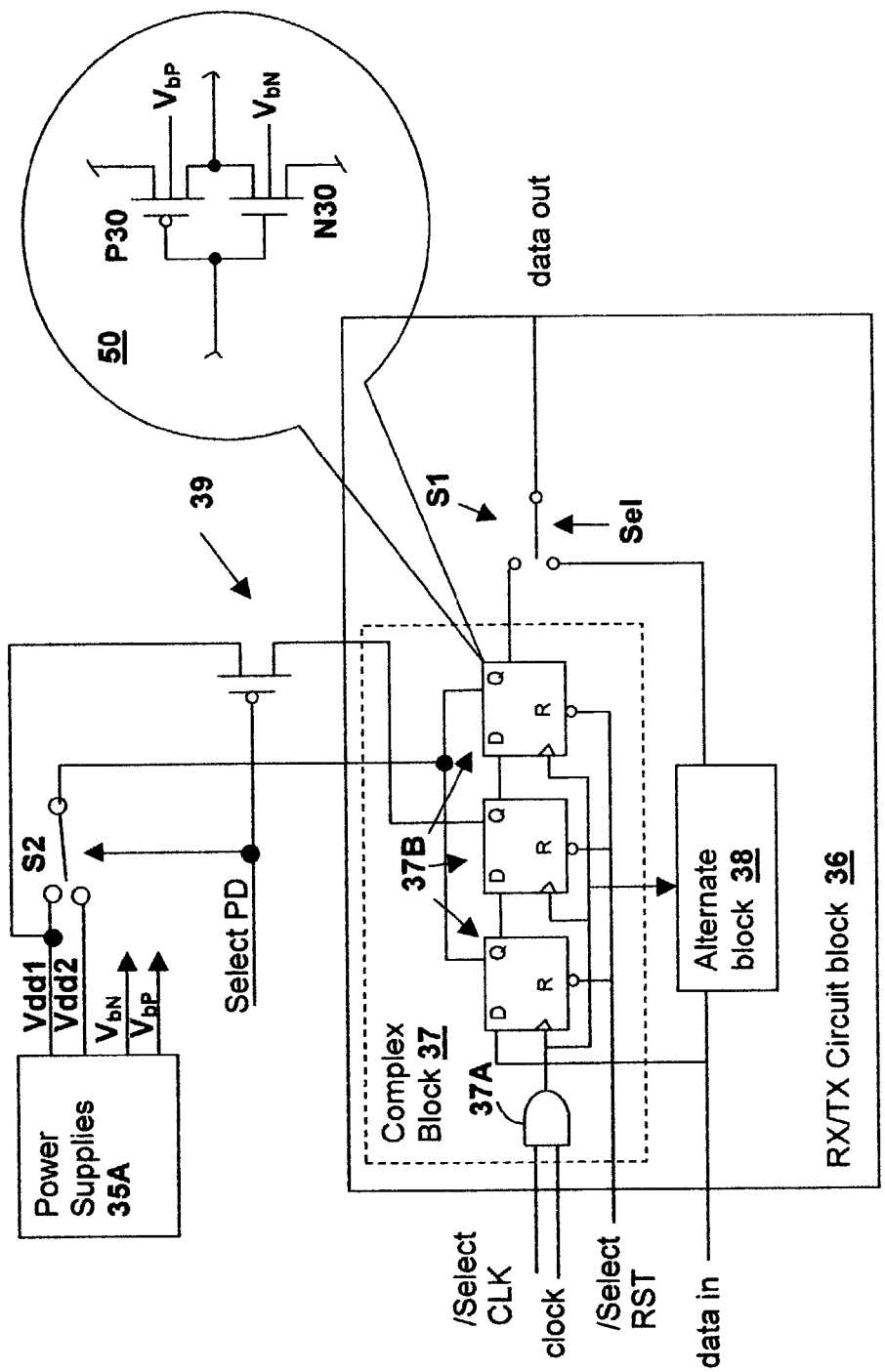
FIG. 3 is a schematic diagram of exemplary power management circuits in accordance with embodiments of the invention.

Referring now to FIG. 3, techniques for controlling power consumption and power supply voltage levels within the interface circuits of FIG. 2 is illustrated. Select PD can be used to control power supplied to blocks having power supplies connected through power control transistor 39 or an equivalent device. Select PD is also coupled to a switch S2 for selecting one of two output voltages of power supplies 35A consistent with the selection of block complexity. Alternatively, a programmable power supply having a settable output voltage may be used for circuit block power supply inputs that can be changed when a complexity state is selected. Power supplies 35A also includes outputs $V_{bN}$ and $V_{bP}$, which may be provided with selectable voltage levels from a programmable bias supply or a switch similar to switch S2 internal to power supplied 35A. Callout 50 illustrates connection of power supplies 35A bias outputs $V_{bN}$ and $V_{bP}$ to the bodies of transistors N30 and P30 which are intended to be illustrative of CMOS transistor circuits within gates and latches of circuit block 37 and circuit block 38. One, but generally many of these CMOS circuits may be substrate-biased with selectable voltage levels from outputs $V_{bN}$ and $V_{bP}$ so that the threshold voltages of transistors N30 and P30 are selected in conformity with a selected complexity of the digital circuits. The technique illustrated may be applied to only the N-channel or P-channel transistors and may be applied in PMOS or NMOS circuits with a single bias output for the appropriate transistor technology used. Selecting a higher threshold voltage for transistor N30 via a lower bias voltage $V_{bN}$ provides lower leakage due to a lowered field strength in the depletion region of the channel of transistor N30. The lowered field strength decreases the leakage through transistor N30 in its off state and also decreases the cross-conduction time when transistor N30 switches state. Similarly, a higher bias voltage $V_{bP}$ provides decreased leakage through and power dissipation within transistor P30.

In alternative complexity selection schemes that may also be used in combination, /Select CLK disables a clock via NAND gate 37A or equivalent device which serves as a clock disable circuit and /Select RST holds registers 37B in a reset condition. The power supply selection scheme described above using switch S2 or a programmable power supply output may be used with the alternative complexity selection schemes described above, in which case Select PD becomes only a power supply selection signal rather than a block power supply disable signal and transistor 39 is not required.

Sel selects between complex block 37 and alternate block 38 (which generally will be disabled when complex block 37 circuits are enabled). The circuits shown in FIG. 3 are illustrative and are not typical of the transceiver circuits described above, which contain a greater number of registers and gates. But the techniques illustrated can be applied together or selectively to disable power consumption within the complex portions of the above-described receivers and reduce power supply voltages on the less complex portions of the above-described receivers. Since eliminating clocks or state changes in modern digital circuits may have the same effect on power consumption as removing power as long as leakage paths are not present, any of the above techniques may be sufficient. Another power reduction mechanism is the simplification of and supply voltage reduction to state machine circuits, wherein alternative state machines may be selected similarly to the selection between complex block 37 and alternate block 38 or by disabling some of the state registers (and changing the combinatorial feedback logic accordingly) and selecting a corresponding power supply voltage.

Figure 4:
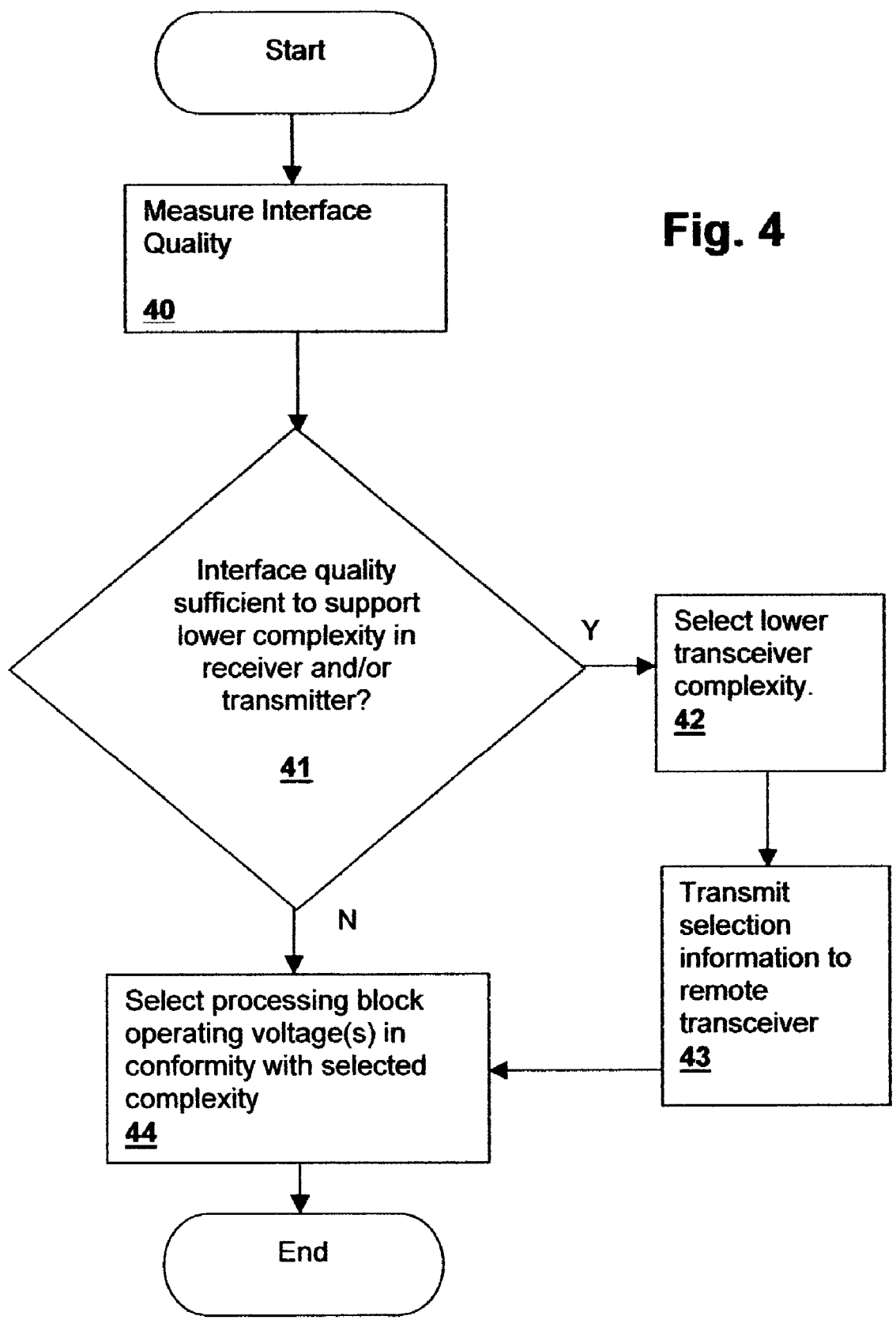
FIG. 4 is a flowchart depicting a method in accordance with an embodiment of the invention.

Referring now to FIG. 4, a control method in accordance with an embodiment of the present invention is shown in a flowchart. First, interface channel quality is measured (step 40) and if the interface channel quality is sufficient to support a lower power consumption state within the transceiver (decision 41), the lower transceiver complexity is selected (step 42) and the selection information is optionally transmitted over the interface to any connected remote transceivers (step 43). Processing block power supply operating voltages are then selected in conformity with the selected circuit complexity (step 44). The above-illustrated method includes optional steps 40 and 43, to illustrate a complete functionality including autonomic measurement and optional remote control of remote transceivers. However, it should be understood that those optional steps are not necessary for the practice of the invention.

The above described steps are also not intended to limit the control of power supply voltage and complexity. For example, a power supply voltage may be set and a supportable complexity the computed and selected or both selections may be made at one time. Further, computation of supportable complexity for a given power supply voltage or power supply voltage for a given complexity may be performed during the design phase and selections made in accordance with pre-programmed tables.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A transceiver for interconnecting electronic devices, comprising:
    at least one interface circuit including an internal processing block having selectable complexity, said interface circuit including at least one electrical terminal adapted for connection to an interconnect bus bearing one or more interface signals to a remote transceiver;
    a power supply circuit coupled to said internal processing block and having a selectable output voltage level;
    a select input coupled to said at least one interface circuit for receiving a selection signal, whereby a level of complexity of said processing block is selected by a logic state of said select input and wherein a power supply voltage level of said power supply circuit is further selected in conformity with said select input; and
    a communication link for transmitting a state of said select input to a remote transceiver over said interconnect bus.

2. A method of controlling power consumption in an interface transceiver, comprising:
    receiving an indication of that power consumption of said interface transceiver may be reduced;
    in response to said receiving, selecting a complexity of said receiver;
    in further response to said receiving, selecting a power supply voltage level of at least one internal processing block of said interface transceiver;
    operating said interface transceiver with said at least one internal processing block operating at said selected power supply voltage level to communicate at least one signal to a remote transceiver over an interconnect bus including at least one signal conductor;
    measuring, within said interface transceiver, a quality of an interface signal carried on said interconnect bus;
    determining whether or not said quality is above a threshold level; and
    in response to determining that said quality is above a threshold level, generating said indication.

3. The method of claim 2, further comprising communicating a state of said indication to a remote transceiver.

* * * * *